United States Patent Office 3,026,730
Patented Mar. 27, 1962

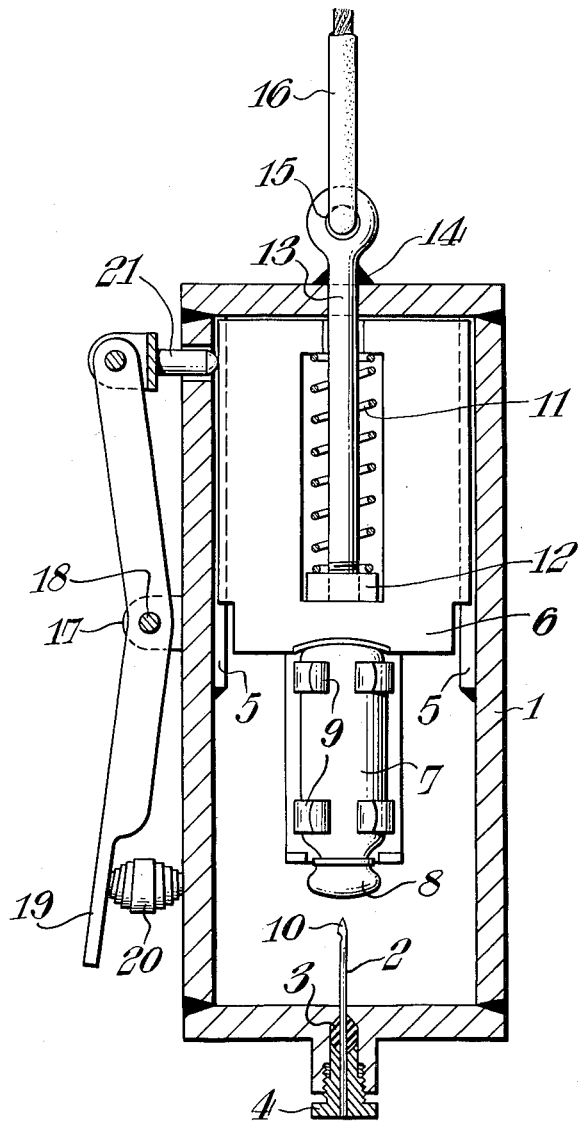
INVENTORS
ARTHUR JAMES HOWARTH
REX WILLIAM COLLINS
BY *Lawson and Taylor*

3,026,730
SAMPLING DEVICES
Arthur James Howarth, Holmrood, England, and Rex W. Collins, Thurso, Caithness, Scotland, assignors to United Kingdom Atomic Energy Authority, London, England
Filed Aug. 27, 1959, Ser. No. 836,506
Claims priority, application Great Britain Aug. 29, 1958
1 Claim. (Cl. 73—425.4)

This invention relates to sampling devices and is primarily concerned with the sampling of radioactive liquids.

The sampling of radioactive liquids is accompanied by a number of dangers such as those of exposure to radiations from the liquids and inhalation of airborne droplets. The sampling also involves the problem of remote operation with a high standard of cleanliness to avoid contamination of surrounding objects.

These dangers and problems have been reduced by the use of evacuated elastomer-capped sampling bottles which are moved by remotely operated tools into contact with a sampling needle (such as a hypodermic needle) arranged so that the unpointed end of the needle dips into the liquid to be sampled and the pointed end penetrates the elastomer cap. On penetration of the cap, liquid is sucked into the bottle via the needle and on withdrawing the bottle from the needle the elastomer cap wipes the needle clean. The elastomer cap is self sealing to retain the liquid in the sampling bottle.

One form of apparatus for sampling liquids using evacuated elastomer-capped sampling bottles is disclosed in British Patent No. 776,617.

The present invention is concerned with extending the evacuated, elastomer-capped sampling bottle technique to the sampling of liquids at random depths in storage vessels.

The sampling device according to the invention has a body member and a member guidably movable relative to the body member, supporting means on one of said members for an elastomer-capped sampling bottle, and supporting means on the other of said members for a sampling needle in alignment with said sampling bottle and means for remotely applying a force to one of said members so as to produce relative movement between said members in a direction such that the sampling needle is caused to penetrate the cap of the sampling bottle.

An embodiment of the invention will now be described by way of example with reference to the single figure of the accompanying drawing which is a sectional elevation. A body 1, in the form of a rectangular framework, supports a hollow sample needle 2 by means of a rubber grip 3 and screwed plug 4 and has a pair of guides 5 for a movable carrier member 6 of substantial weight compared with that of the body 1 upon which is mounted an evacuated sample bottle 7 provided with a rubber sealing cap 8, the bottle being retained on carrier 6 by a paid of spring clips 9. Needle 2 is in co-axial alignment with bottle 7 and is provided with a pointed end 10 adjacent the rubber cap 8, the unpointed end of the needle being level with the head of the screwed plug 4. A spring 11 biases carrier 6 against moving in a downwards direction and is located between the upper portion of carrier 6 and a stop member 12, the latter forming part of body 1. One end of a pin 13 is screwed into stop 12 and is welded to body 1 at 14. The pin 13 is formed with an eye 15 through which is threaded a plastic-covered rope 16.

A bracket 17 is attached to one side of a body 1 to form a pivot point 18 for a lever 19 which is loaded at one end with a spring 20 and has attached at its other end a locking pin 21 bearing against the upper part of carrier 6.

In operation, the complete apparatus is lowered by the rope 16 into a tank or similar receptacle of radio-active liquid, and at the depth wherein it is desired that a sample be taken, rope 16 given a sharp pull. Due to inertia, carrier 6 moves downwardly on guides 5 to force the rubber cap 8 of the sample bottle over the pointed end 10 of needle 2. As this occurs, locking pin 21 moves to the right under the influence of spring 20 to prevent spring 11 from returning carrier 6 to its original position. The bottle 7 is thus held over the needle 2 whilst a sample of liquid is drawn from the tank through the needle 2 and into the bottle.

After waiting a short period for the sampling to be completed, the apparatus is raised by rope 16 and placed in a suitable holding device. Lever 19 is then depressed by means of a long pole, allowing spring 11 to raise the carrier 6 and withdraw bottle 7 off needle 2. As this occurs, the rubber cap 8 wipes the needle 2 clean, and, as the puncture made by the needle is very small, self-seals the cap. Bottle 7 may now be removed from carrier 6 by suitable tongs and the apparatus washed before further use.

In a further embodiment (not shown) the spring 11 and carrier locking mechanism 17 to 21 may be dispensed with and substituted by a pair of trip catches. These catches may be arranged to normally support the weight of the bottle carrier until overcome by inertia when they would allow the carrier to move downwardly but prevent its return until later released.

We claim:

A sampling device having a body member, a hollow sampling needle mounted on said body member, a massive carrier member slidably supported on said body member, an evacuated elastomer-capped sampling bottle mounted on said carrier, resilient means tending to restrain said carrier member and body member against movement in a direction of approach of said bottle and needle, a releasable latch for retaining said members in a relative position in which said needle penetrates the cap of said bottle, and elongate flexible-means secured to said body part so as to be operable to suspend the device in a liquid to be sampled and by means of a sudden upward force applied to the flexible means to cause the body part to move upwardly, the inertia possessed by the carrier member due to its massive nature causing it to resist upward movement against the action of said resilient means, the resultant relative movement between the body member and the carrier member causing the needle to penetrate the cap of said bottle and allow liquid to pass into said bottle through the needle, and the latch engaging to retain the members in the sampling position until released to allow the resilient means to urge the members into their initial position ready for another sampling operation.

References Cited in the file of this patent

UNITED STATES PATENTS

| | | |
|---|---|---|
| 2,374,227 | Metcalf | Apr. 24, 1945 |
| 2,500,169 | Ellis | Mar. 14, 1950 |
| 2,865,410 | Neely | Dec. 23, 1958 |